E. A. WOOD.
SCREEN.
APPLICATION FILED AUG. 4, 1913.

1,103,167.

Patented July 14, 1914.
2 SHEETS—SHEET 1.

WITNESSES

INVENTOR
EARL A. WOOD,
BY
ATTORNEYS

E. A. WOOD.
SCREEN.
APPLICATION FILED AUG. 4, 1913.
1,103,167.
Patented July 14, 1914.
2 SHEETS—SHEET 2.
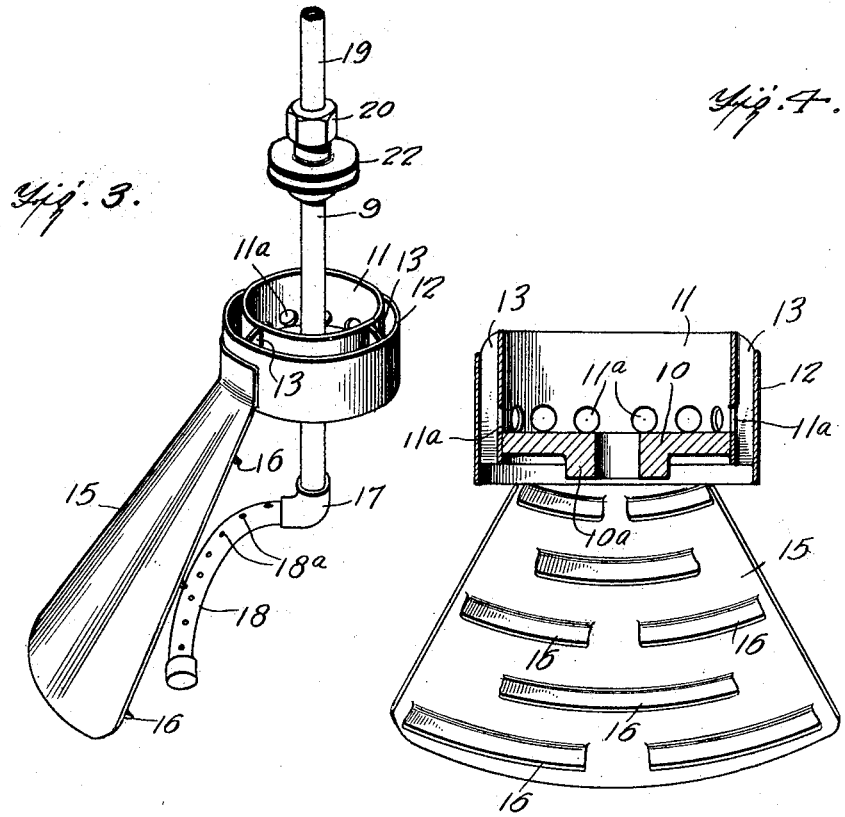
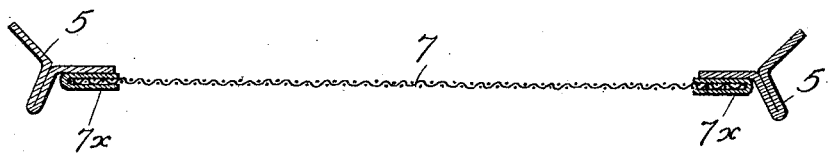
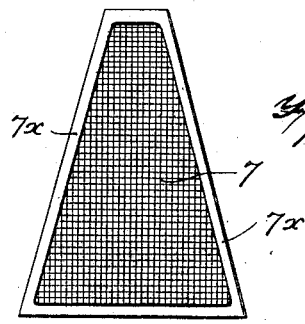
WITNESSES
INVENTOR
EARL A. WOOD,
BY
ATTORNEYS

UNITED STATES PATENT OFFICE.

EARL ADAM WOOD, OF GEM, IDAHO.

SCREEN.

1,103,167.  Specification of Letters Patent.  Patented July 14, 1914.

Application filed August 4, 1913. Serial No. 782,827.

*To all whom it may concern:*

Be it known that I, EARL A. WOOD, a citizen of the United States, and a resident of Gem, in the county of Shoshone and State of Idaho, have made certain new and useful Improvements in Screens, of which the following is a specification.

My invention relates to improvements in screens for use in lieu of hydraulic classifiers, and it consists in the combinations, constructions and arrangements herein described and claimed.

An object of my invention is to provide a device by means of which fine ores may be treated preparatory to concentration in a manner which effectually and economically prepares the ores for their subsequent treatment.

A further object of my invention is to provide a device which may be used in lieu of a hydraulic classifier in which the separation of the ore constituents may be made at a more rapid rate than with the ordinary hydraulic classifier.

Other objects and advantages will appear in the following specification and the novel features of the device will be particularly pointed out in the appended claims.

My invention is illustrated in the accompanying drawings forming part of this application in which—

Figure 1:
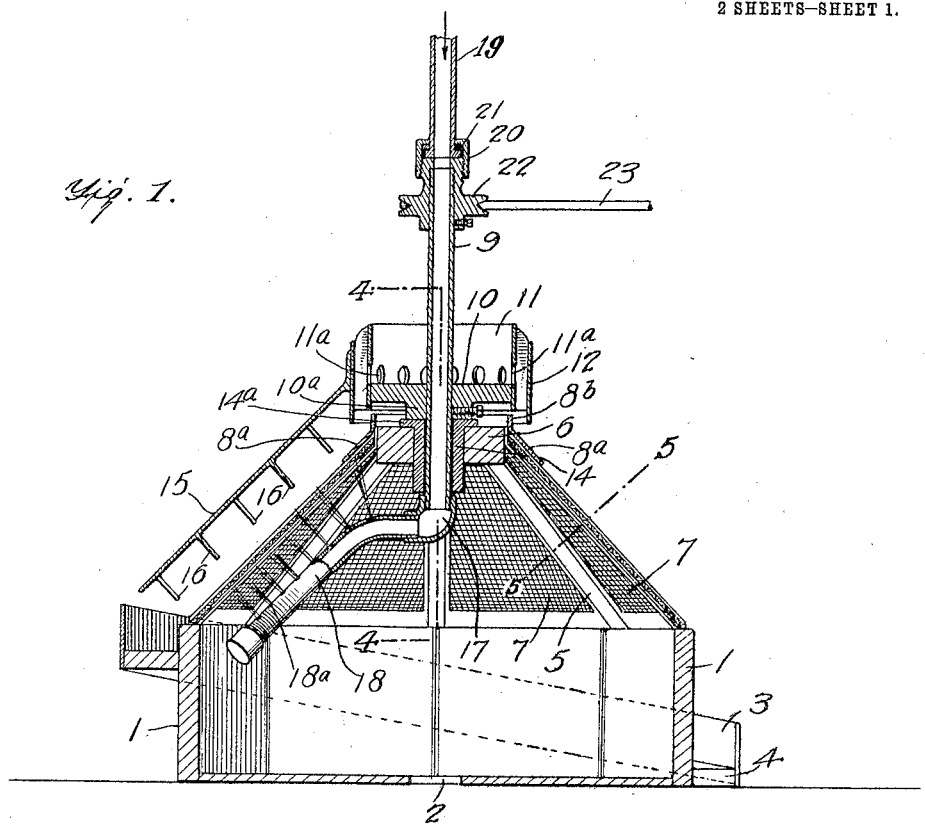
Figure 2:
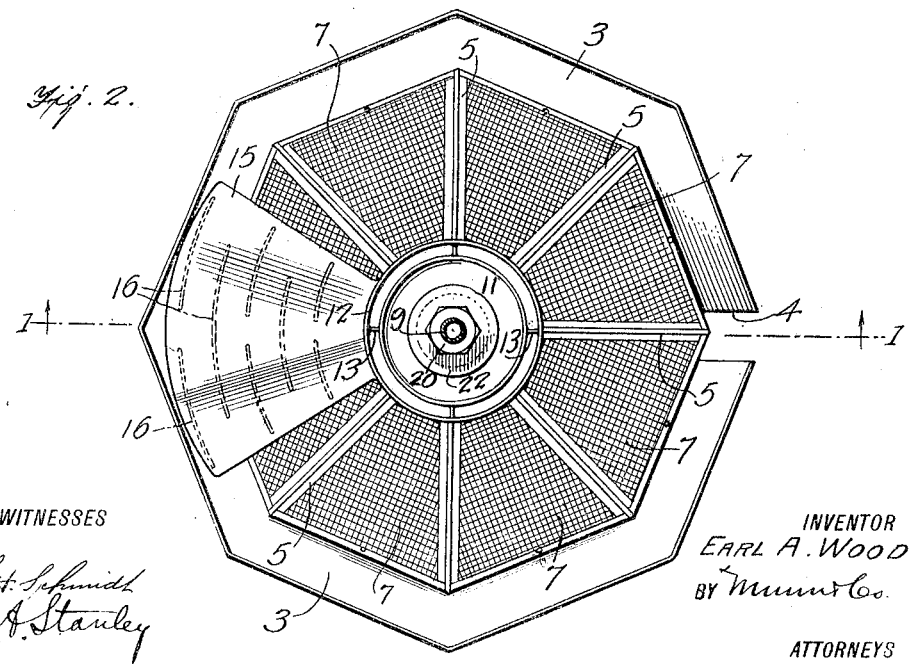

Figure 1 is a vertical section through the device, along the line 1—1 of Fig. 2, Fig. 2 is a plan view of the device, Fig. 3 is a perspective view of a portion of the spraying device and shield, Fig. 4 is a section along the line 4—4 of Fig. 1, the screen being omitted for the sake of clearness. Fig. 5 is a section along the line 5—5 of Fig. 1, and Fig. 6 is a face view of one of the sides of the screen.

In carrying out my invention I provide a tank 1 of any suitable shape. This is provided with a central opening 2 in its bottom. In the drawings I have shown this tank as being formed in octagonal shape, but it is obvious that other shapes might be used without departing from the spirit and the scope of the invention. On the outside of the tank is an inclined run-way 3, which is highest at one side and which slopes gradually to the other side, an outlet 4 being provided for the discharge of the over-size.

Secured to the tank are a series of inclined T-irons 5, like those shown in Fig. 5. These are joined together at the tops by a circular block 6 and constitute a supporting frame 4, a series of screen members like that 7 in Fig. 1 being provided. These screen members, it will be seen, are provided with an exterior frame $7^x$. They are of such a size as to lie on the upper sides of the inclined angle irons 5. Arranged to extend over the upper ends of the screens 7 is an annular collar having a flaring portion $8^a$ and a cylindrical portion $8^b$.

A pipe 9 is disposed centrally of the apparatus. To this pipe is secured the hub $10^a$ of a plate 10. The latter constitutes the bottom of a receptacle 11, which is provided with openings $11^a$. On the outside of the receptacle 11 is secured an annular casing 12, ribs 13 being provided for joining the casing to the outer portion of the receptacle 11. The lower end of the casing 12 is open and terminates just above the flaring portion $8^a$ of the annular deflector. A sleeve 14 having a head $14^a$ is provided upon which the hub $10^a$ turns.

Secured to the outer sides of the casing 12 is a shield 15, which is provided on its inner side with a series of flanges 16 whose purpose will be explained later. At the bottom of the pipe 9 is an elbow 17 which bears a curved pipe 18 closed at one end and provided with perforations $18^a$ on the side facing the screen. The pipe 9 is connected with an inlet pipe 19 by means of a joint 20 which has a packing gland 21 to prevent the leakage of water. A drive pulley 22 is secured on the pipe 9 and may be driven by a belt or rope 23.

From the foregoing description of the various parts of the device the operation thereof may be readily understood.

The finely divided ore is fed into the receptacle 11 and the pipe 9 is revolved by means of the belt 23 and pulley 22, or in any other suitable manner. The head $14^a$ of the sleeve 14 serves as a bearing member for the plate 10. The ore passes out through the openings $11^a$ and drops down upon the deflector $8^a$ and thence passes out upon the screen 7. Water is being supplied to the pipe 9 through the pipe 19 and plays on the under part of the screen. This tends to separate the finer material from the over-size, the latter passing down the screen into the discharge chute 3.

The water which passes through the screen and which strikes the shield 15 is again returned upon the screen by means of the flanges 16 and washes the finer portions through the screen into the tank 1 where they may be withdrawn through the opening 2. It will be understood that the shield revolves with the pipe and with the feed distributer formed by the plate 10 and its casing 11. The water which runs from the shield therefore is not opposed by that which is being forced through the screen, since by the time the former returns, the water from the pipe 9 is being fed to some other portion of the screen.

The device may be made to operate continually by feeding the ore and constantly revolving the stream which plays upon the screen. The over-size passes down the inclined chute 3 and is deposited at the opening 4. The device forms a convenient and rapid method of ore treatment preparatory to concentrating the ore, and since it is continuous in operation and does not have to be emptied or refilled it is more expeditious than the ordinary hydraulic classifier of the treatment of ores prior to concentration.

I claim:—

1. The combination with a tank, of a series of inclined screen members disposed above said tank, means for feeding ore at the tops of said inclined screen members, means for projecting water upon the screens from the under side, and a shield disposed outside of the screen and above the latter for returning the water upon the screen.

2. The combination with a tank, of a series of inclined screen members disposed above said tank, means for feeding ore at the tops of said inclined screen members, means for projecting water upon the screens from the under side, and a shield disposed outside of the screen and above the latter, said screen being provided with downwardly inclined transverse flanges for returning the water upon the screen.

3. The combination with a tank, of a series of inclined screen members disposed above said tank, means for feeding ore at the tops of said inclined screen members, means for projecting water upon the screens from the under side, a shield disposed outside of the screen and above the latter, said screen being provided with downwardly inclined transverse flanges for returning the water upon the screen, and means for simultaneously shifting said water projecting means and said shield from one portion of the screen to another.

4. The combination with a tank having an inclined chute on the outside thereof, of a substantially conical inclined screen disposed above the tank, a receptacle disposed above the screen, a water pipe arranged to extend through said receptacle, said water pipe being curved to extend in close proximity to said screen and being perforated on the side next to the screen, a shield carried by said receptacle above said screen and provided with a series of downwardly inclined flanges, the end of said shield projecting over said chute, and means for rotating said receptacle, said pipe and said shield simultaneously.

5. The combination with a tank, of an inclined chute secured to said tank on the outside thereof, a substantially conical-shaped screen disposed above said tank, a stationary block or plate carried by said screen, a receptacle mounted for revolution on said stationary block, a pipe arranged to pass through the bottom of said receptacle, means for securing the receptacle to the pipe, said receptacle having perforations in its sides near the bottom of the receptacle for discharging material upon said screen, a shield having downwardly inclined flanges on its under surfaces, said shield being arranged to extend over part of said screen, and means connected with said pipe for projecting water on the bottoms of said screen.

6. The combination with a tank, of an inclined chute secured to said tank on the outside thereof, a substantially conical-shaped screen disposed above said tank, a stationary block or plate carried by said screen, a receptacle mounted for revolution on said stationary block, a pipe arranged to pass through the bottom of said receptacle, means for securing the receptacle to the pipe, said receptacle having perforations in its sides near the bottom of the receptacle for discharging material upon said screens, a shield having downwardly inclined flanges on its under surfaces, said shield being arranged to extend over part of said screen, means connected with said pipe for projecting water on the bottoms of said screen, said last named means comprising an extension of said first named pipe, said extension being curved to extend in close proximity to the screen and being provided with perforations on the side next to the screen, said extension registering approximately with the center of said shield, and means for revolving the pipe.

7. In an ore screening device, a feed pipe, a plate having a central opening arranged to receive the feed pipe and being provided with a hub, means for securing the hub of the plate to the feed pipe, a casing secured to the periphery of said plate, said casing being perforated near its bottom and forming with the plate a receptacle, an annular wall spaced from said casing on the outside thereof, integral ribs connecting said wall and said casing, a shield secured to one side of said annular wall, said shield being disposed angularly of said feed pipe and being provided with tranverse flanges on one side, and an extension carried by said pipe, said extension being bent laterally toward said shield and being provided with perforations on the side facing the shield.

8. In an ore screening device, a feed pipe, a plate having a central opening arranged to receive the feed pipe and being provided with a hub, means for securing the hub of the plate to the feed pipe, a casing secured to the periphery of said plate, said casing being perforated near its bottom and forming with the plate a receptacle, an annular wall spaced from said casing on the outside thereof, integral ribs connecting said wall and said casing, a shield secured to one side of said annular wall, said shield being disposed angularly of said feed pipe and being provided with transverse flanges on one side, an extension carried by said pipe, said extension being bent laterally toward said shield and being provided with perforations on the side facing the shield, a substantially conical-shaped screen, and means for rotatably supporting said plate, said perforated extension being disposed on one side of the screen and the shield on the opposite side of the screen and arranged to register with the extension.

EARL ADAM WOOD.

Witnesses:
W. A. LUCE,
E. LA FAIVRE.

Copies of this patent may be obtained for five cents each, by addressing the "Commissioner of Patents, Washington, D. C."